United States Patent [19]
Bruck et al.

[11] Patent Number: 5,561,805
[45] Date of Patent: Oct. 1, 1996

[54] SYSTEM FOR SELECTIVELY PACKING TOGETHER DATABLOCKS AND EFFICIENTLY ROUTING INDEPENDENT OF NETWORK TOPOLOGY IN A PARALLEL COMPUTER SYSTEM IN ACCORDANCE WITH A SELECTED NUMBERING SYSTEM

[75] Inventors: Jehoshua Bruck, Palo Alto; Ching-Tien Ho, San Jose, both of Calif.; Shlomo Kipnis, Teaneck, N.J.

[73] Assignee: International Business Machines Corporation, Armonk, N.Y.

[21] Appl. No.: 965,491

[22] Filed: Oct. 22, 1992

[51] Int. Cl.$^6$ .................................. G06F 13/00
[52] U.S. Cl. .............. 395/800; 395/200.15; 395/858; 364/228.3; 364/229; 364/232.22; 364/DIG. 1
[58] Field of Search .................... 390/800, 250; 370/60; 364/200, 746; 395/200.15, 858

[56] References Cited

U.S. PATENT DOCUMENTS

| | | | |
|---|---|---|---|
| 4,598,400 | 7/1986 | Hillis | 370/60 |
| 4,814,973 | 3/1989 | Hillis | 364/200 |
| 4,814,979 | 3/1989 | Neches | 364/200 |
| 4,814,980 | 3/1989 | Peterson et al. | 364/200 |
| 4,920,484 | 4/1990 | Ranade | 364/200 |
| 4,984,235 | 1/1991 | Hillis et al. | 370/60 |
| 4,985,832 | 1/1991 | Grondalski | 364/200 |
| 5,008,815 | 4/1991 | Hillis | 364/200 |
| 5,117,420 | 5/1992 | Hillis et al. | 370/60 |
| 5,151,900 | 9/1992 | Synder et al. | 370/94.3 |
| 5,151,996 | 9/1992 | Hillis | 395/800 |
| 5,152,000 | 9/1992 | Hillis | 395/800 |
| 5,170,482 | 12/1992 | Shu et al. | 395/800 |
| 5,241,660 | 8/1993 | Michael et al. | 395/250 |
| 5,313,645 | 5/1994 | Rolfe | 395/800 |

FOREIGN PATENT DOCUMENTS

| 132926 | 2/1985 | European Pat. Off. |
|---|---|---|
| WO8808652 | 11/1988 | WIPO |

OTHER PUBLICATIONS

S. L. Johnsson, C. T. Ho, Algorithms for Matrix Transposition on Boolean N-Cube Configured Ensemble Architectures, SIAM J. Matrix Anal. Appl., vol. 9, No. 3, pp. 419–454, Jul. 1988.

C. T. Ho and M. T. Raghunath, Efficient Communication Primitives on Hypercubes, Concurrency: Practice and Experience, vol. 4(6), pp. 427–457, Sep. 1992.

S. L. Johnsson, C. T. Ho, Optimum Broadcasting and Personalized Communication in Hypercubes, Reprinted from IEEE Transactions on Computers, vol. 38, No. 9, pp. 1249–1268, Sep. 1989.

*Primary Examiner*—Thomas C. Lee
*Assistant Examiner*—Le Hien Luu
*Attorney, Agent, or Firm*—James C. Pintner; Philip E. Blair

[57] ABSTRACT

A method for routing multiple message packets to their respective destinations on a parallel system is disclosed which takes into account the value of the communication start-up time and the transmission time For the specific parallel system. The preferred embodiment involves first selecting a base using the parameters of communication start-up and transmission time and then for each datablock, subtracting the node address from the destination address of the datablock using the modulo-n subtractions to Form a relative offset and representing the relative offset in the pre-selected base before sending the datablocks to their destination nodes in phases, each phase involving scanning the individual i-th digits of the relative offset value and packing those datablocks with identical i-th digits of the relative offset together.

15 Claims, 6 Drawing Sheets

SYSTEM FOR SELECTIVELY PACKING TOGETHER DATABLOCKS AND EFFICIENTLY ROUTING INDEPENDENT OF NETWORK TOPOLOGY IN A PARALLEL COMPUTER SYSTEM IN ACCORDANCE WITH A SELECTED NUMBERING SYSTEM

FIELD OF THE INVENTION

The present invention relates to methods for routing a plurality of datablocks on a parallel system, and more particularly, to methods for multi-packet routing of a plurality of datablocks amongst an arbitrary subset of processors on a message-passing parallel system.

BACKGROUND HISTORY

Multiprocessor computer systems having parallel architectures employ a plurality of processors that operate in parallel to simultaneously perform a single task. On parallel multiprocessor systems, a problem is broken up into several smaller sub-problems then distributed to the individual processors which operate on separate segments of the sub-problems allocated to them. With such a parallel architecture, a complex task can be solved in parallel simultaneously by all processors to produce a solution in a much quicker time than it would take for a single processor to perform the task alone.

In order for many processors to collectively solve a single task, they must communicate with each other by sending and receiving messages through a network which interconnects all the processors. In many cases, collective communications are required among different subsets of processors. An efficient and portable communication library consisting of a set of frequently used collective communication primitives is crucial to successfully programming a parallel processing system. The communication library provides not only ease in parallel programming, debugging, and portability but also efficiency in the communication processes of the application programs.

A frequently used collective communication primitive is the multi-packet routing operation wherein each processor in a set has a collection of datablocks of various sizes and wherein each datablock needs to be sent to its respective destination processor in the set on the parallel network. A few frequently used collective communication primitives, which are special cases of the multi-packet routing operation, are the scatter, gather, and index operations. In the scatter operation among a set of n-nodes, there is a source node in the set which has n-blocks of data which need to be distributed amongst n-nodes in the set at one datablock per node. In the gather operation among n nodes, wherein each node has one datablock initially, there is one destination node in the set to collect all n-blocks from all n-nodes, i.e., concatenate datablocks in a node without performing reduction. In the index operation among a set of n-nodes, each node in the set has n blocks of data initially. Each i-th node in the set needs to send its j-th datablock to node j and receive the i-th datablock of node j.

The scatter, gather, and index operations and the multi-packet routing operation are important collective communication primitives in the communication library which finds uses in many real-world scientific, numeric and commercial applications. Examples of such applications include the matrix transpose which is one of the most basic linear algebra operations, bitonic sorting, the Alternating Direction Implicit (ADI) method for solving partial differential equations, and the solution of Poisson's problem by either the Fourier Analysis Cyclic Reduction (FACR) method or the two-dimensional FFT method. Multi-packet routing operation can also be used as a run-time support to general communication which is required in a network of workstations and a network of disks or I/O nodes. Thus, a fundamental problem in the art has been to devise efficient algorithms for the scatter, gather, index, and the multi-packet routing operations.

Most prior art for collective communication primitives are dependent on a fixed parallel system topology such as a mesh or hypercube. Although these prior art algorithms are well-suited to the topology for which they are specifically designed, these algorithms cannot be easily ported to other parallel topologies. Many of these algorithms are restricted to certain forms because of the number of processors involved. For instance, algorithms for collective communication primitives on hypercubes typically assume that the number of processors is a power of two and thus cannot be easily extended to an arbitrary number of processors without a subsequent loss of efficiency. Thus, what is needed is to devise algorithms which are independent of the underlying topology without loss of efficiency and to devise algorithms for collective communication primitives which can run on an arbitrary set of processors wherein the number of processors in the set is not necessarily a power of two and the processors in the set do not necessarily form a structure such as a subcube or a submesh.

There are many other advantages in having topology-independent algorithms. One is that they accurately reflect certain parallel architectures where processors are interconnected through multi-stages of switches, crossbar switches, and buses. Another is that with the availability of more advanced routings such as the circuit-switched, wormhole, and virtual cut-through routings wherein the distance (i.e., number of hops) between processors becomes irrelevant. Still another is that topology-independent algorithms can be helpful for creating algorithms for more specific topologies.

The issue of efficiency of topology independent algorithms for collective communication primitives is important for increased performance of most application programs. Efficiency most often depends on two important parameters of the underlying machines: one is the communication start-up time and the other is the transmission time. The communication start-up time is the overhead, e.g., caused by software and hardware, that is associated with each subsequent communication call, namely a send or a receive operation, while the transmission time is the time required to transmit each data element, e.g., one byte on the communication network.

Due to the different characteristics of different parallel machines, it has been desirable to design routing algorithms which not only are portable but which also remain efficient across various parallel machines. For instance, a multi-packet routing algorithm, which is optimized for the start-up time, may have poor performance on a machine which has a large transmission time relative to the start-up time. On the other hand, a multi-packet algorithm, which is optimized for the transmission time, may perform poorly on a machine which has a large start-up time relative to the transmission time. Therefore, what is needed in the art is a routing algorithm which is tunable according to machine parameters such as the start-up time and transmission time and to have a class of algorithms which can be parameterized so as to provide a balance between the start-up time and transmission time of the specific architecture.

SUMMARY AND OBJECTS OF THE INVENTION

The present invention relates to methods For multi-packet routing of a plurality of datablocks among an arbitrary subset of processors on a message-passing parallel system.

It is a primary object of the invention to provide an efficient method for frequently used communication primitives such as the multi-packet routing operation and the index, scatter, and gather operations on a message-passing parallel system.

It is another primary object of the present invention to provide a multi-packet routing algorithm which is tunable according to the parameters of the underlying architecture dependent on the communication start-up time and transmission time.

It is yet another primary object of the present invention to provide a multi-packet routing algorithm which is topology independent so as to achieve maximum portability across numerous parallel architectures.

It is still another primary object of the present invention to provide a multi-packet routing algorithm for an arbitrary number of processors so which is not restricted to a particular structure such as a subcube or submesh.

Briefly and to achieve the foregoing objects in accordance with the present invention as embodied and broadly described herein, a method For routing multiple message packets to their respective destinations on a parallel system is provided which takes into account the value of the communication start-up time and the transmission time for the specific parallel system. The method involves the first step of selecting a base using the parameters of communication start-up and transmission time. The second step involves for each datablock, subtracting the node address from the address of the datablock using the modulo-n subtractions to form a relative offset and representing the relative offset in the pre-selected base. The third step involves sending the datablocks to their destination nodes in phases, each phase involving scanning the individual i-th digits of the relative offset value and packing those datablocks with identical i-th digits of the relative offset together before sending those packed datablocks to their respective intermediate destination addresses.

Additional objects and advantages of the present invention will be set forth in the description which follows, and in part will be obvious from the description or may be learned by the practice of this invention. The objects of this invention as described herein may be realized and obtained by means particularly pointed out and distinctly claimed in the appended claims taken in conjunction with the accompanying drawings and detailed specification.

BRIEF DESCRIPTION OF THE DRAWINGS

In order that the manner in which the above-recited objects of the present invention are obtained, a more particular description of this invention briefly described above will be rendered by reference to a specific embodiment thereof which is illustrated in the appended drawings. Understanding that these drawings depict only a the preferred embodiment of the present invention and are therefore not to be considered limiting of its scope, the invention will be described and explained herein with additional specificity and detail through the use of the, accompanying drawings in which.

DETAILED DESCRIPTION OF THE PREFERRED EMBODIMENT

The present invention is directed to a method for multi-packet routing of a plurality of datablocks among an arbitrary subset of processors on a message-passing parallel system.

A typical message-passing parallel system, wherein the method of the present invention would be embodied, consists of a plurality of nodes wherein each node may either be a processing element such as a computer, microprocessor, or workstation, or a storage device such as a cache, memory, disk, or I/O device, or any combination thereof. A node can exchange information with other nodes by sending and receiving messages over the network or directly or indirectly writing to and reading from another node's storage devices. Generally, each node is a processor with local memory and each node communicates with other nodes by sending and receiving message packets. Nodes can be interconnected through communication links directly or through a network of switches, crossbars, or buses. Each node has its own node identifier or node ID and each node contains a list of packets which are units of datablocks of various sizes that are to be sent to their respective destination nodes.

Figure 1A:
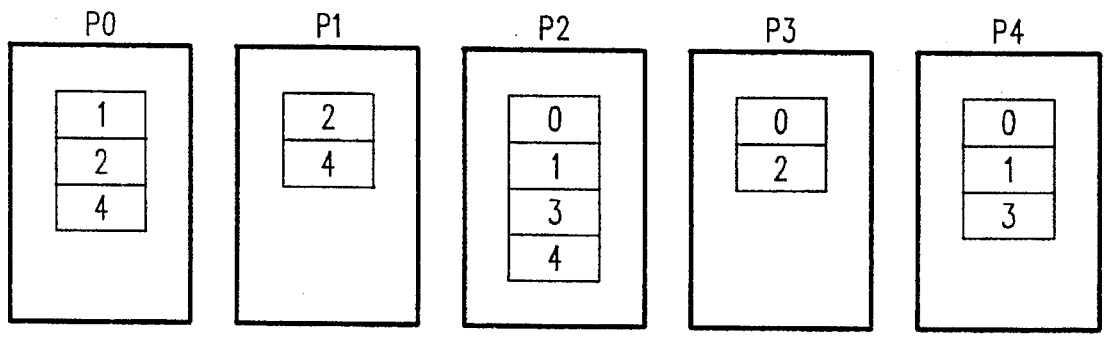
FIG. 1A is a diagram illustrating a set of 5 nodes having processor addresses P0–P4 wherein each node has a number of packets contained therein with each packet having a destination node address.
Figure 1B:
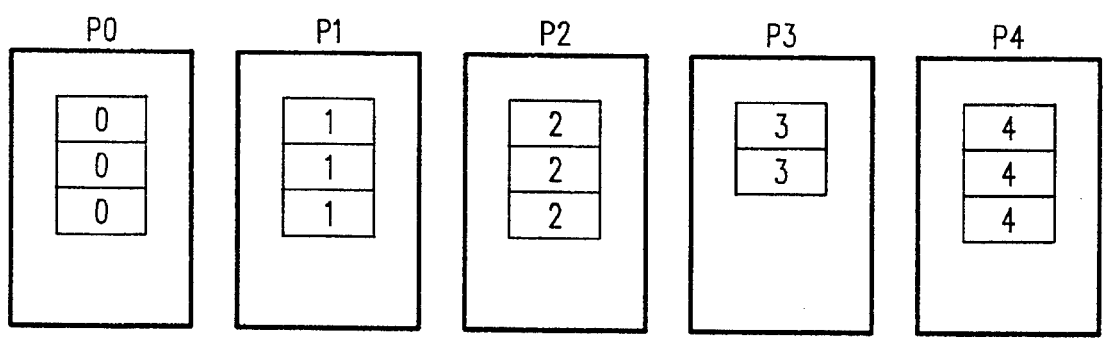
FIG. 1B is a diagram of the set of nodes of FIG. 1A wherein the message packets contained in each processor node have been delivered to their respective destination node addresses.

With reference now being made to FIG. 1A which illustrates a set of 5 nodes having processor addresses P0–P4, each node therein contains a number of message packets each having a destination node address. For instance, processor node P0 has address 0 and contains 3 message packets which are destined for processor node addresses 1, 2 and 4, respectively. Further, processor node P1 has address 1 and contains 2 packets which are destined for node addresses 2 and 4 respectively. Similarly, processor nodes P2, P3, and P4 have their own message packets each having a destination address affixed thereto. As shown in FIG. 1B, the message packets of the set of nodes of FIG. 1A have been delivered to their respective processor node destination addresses.

In the preferred embodiment of the present method, the first method step involves selecting a base-b using the systems parameters. The second step involves for each datablock subtracting the node address from the destination address of the datablock using the modulo-n subtractions to form a relative offset and representing the relative offset in the selected base numbering system. The third step involves sending the packed datablocks to their destination nodes in phases with each phase involving the steps of scanning the individual i-th digits of the relative offset and packing those datablocks with identical i-th digits of the relative offset together before sending the packed datablocks to their respective intermediate destination addresses.

A more particular discussion of the preferred embodiment begins with the first method step wherein a base-b must be chosen. The present method takes advantage of the two parameters, the communication start-up time and the transmission time for the communication sub-system within the parallel system because the present invention is tunable according to these two parameters. The communication start-up time is the overhead created by software and hardware that can be associated with each communication step namely a message send or a message receive. The transmission time is the time which is required to transmit a single data element defined by the system over the communication network.

The communication start-up time is denoted by $t_s$ and the transmission time by $t_{tr}$. The communication time for sending and receiving a single message packet of m number of bytes takes $t_s + m t_{tr}$ units of time to cross the parallel system.

An appropriate integer base is b, where $2 < b < n$. A preferred value for the base-b can be derived as a function of $t_s$, $t_{tr}$, n and M, wherein $t_s$ is the estimated communication start-up time, $t_{tr}$ is the estimated transmission time, and M is the total number of messages over n-nodes, by the following formula:

$$\min_{\forall b \in \{2,3,\ldots,n\}} \left\{ \lceil \log_b n \rceil (b-1) \left[ t_s + \frac{M}{bn} t_{tr} \right] \right\}.$$

Next, the second step of the preferred embodiment involves for each datablock subtracting the node address from the destination address of the datablock using the modulo-n subtractions to form a relative offset and then representing this relative offset in the selected base b. It is fundamental to the present method that a relative offset be computed for each packet in each node. For example, if a packet is in node x initially and is destined for node y then the relative offset r of this particular message packet is defined by $r = (y-x) \bmod n$, wherein mod is the modulo operation. The relative offset of each packet is therefore represented by k-digits using the base-b numbering system previously chosen, where $k = \lceil \log_b n \rceil$. It should be appreciated that every integer in the range of 0 through n-1 can be represented by the selected base-b numbering system in k-digits where each digit is chosen from the set $\{0, 1, \ldots, b-1\}$. Thus r, in the base-b number system is defined as $(r_{k-1}, r_{k-2}, \ldots, r_0)$, where $r = r_{k-1} b^{k-1} + r_{k-2} b^{k-2} + \ldots + r_0 b^0$, and where $r_i \in \{0, 1, \ldots, b-1\}$. Thus, for explanatory purposes herein, $r_i$ is the i-th digit of r in the base-b representation.

In the third step of the preferred embodiment the packed messages are forwarded to their respective intermediate destination node addresses in k phases, iterating from phase 0 through phase k-1. Each phase in the present invention further consists of b-1 subphases, iterating from subphase 1 to subphase b-1. During the subphase j of phase i, each processor node x scans through the i-th digit of the relative offsets in the selected base-b representation of all its current local packets to determine if any of these digits is equal to j. If such relative offset digits are found those packets are packed and sent together in one communication step to the processor node y, wherein $y = (x + jb^i) \bmod n$.

The coefficient $\lceil \log_b n \rceil$ (or ceiling of $\log_b n$) accounts for the maximum number of phases needed in the third method step. Within each phase there are up to b-1 subphases where each subphase corresponds to the sending of one large packed packet and receiving one large packed packet for each node. Thus, there are up to b-1 communication start-ups needed for each phase. Data that needs to be sent out of each node in phase i consists of message packets with non-zero i-th digits of relative offsets. Hence, the average amount of data that needs to be transmitted out of any particular node in the parallel system during a single phase is $$\frac{(b-1)}{b} \times \frac{M}{n}$$

and the estimated time for data transmission in each phase is $$\frac{(b-1)}{b} \times \frac{M}{n} \times t_{tr}.$$

Notice that with the proper choice of base-b, the present method becomes tunable based on the particular machine's parameters and thus balances the start-up time with the transmission time so as to become portable across a wide range of parallel architectures with differing characteristics.

It should be understood that the choice of base-b can be derived by other formulas when the information about the distribution of the sizes and destinations of all packed message packets are known by all nodes in the set or when the multi-packet routing operation becomes more regular to such operations like scatter, gather, or index.

Before proceeding, the examples provided herein and discussed below use the base 2, 3, and 5 numbering systems arbitrarily chosen for illustrative purposes.

Figure 2:
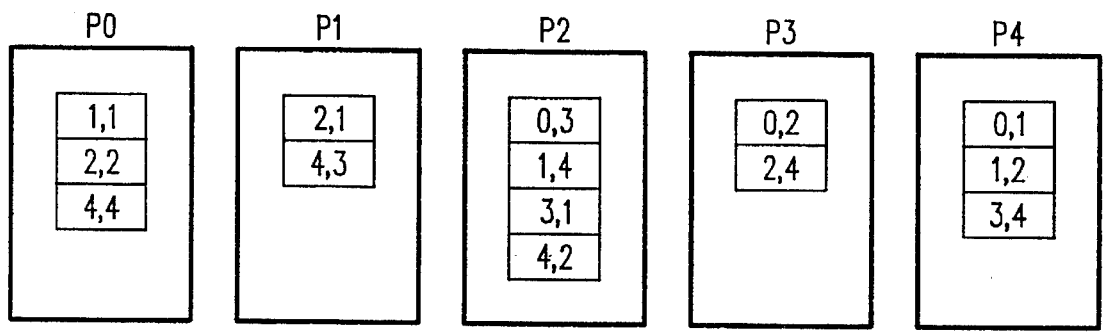
FIG. 2 is a diagram illustrating a set of 5 nodes having processor addresses P0–P4 wherein each node has a number of message packets contained therein and wherein a (destination, relative offset) is associated with each message packet.

Reference is now being made to FIG. 2, which illustrates a set of 5 nodes having processor node addresses P0–P4 wherein each node has a number of message packets contained therein and wherein a (destination, relative offset) is associated with each message packet using the traditional base-10 (i.e., decimal) numbering system. FIG. 2 shows the resultant computation of the relative offsets for all message packets in all processor nodes of FIG. 1A. For instance, processor node P2 contains four message packets. The first message packet has the destination address of 0 and a relative offset of 3. Recall in the second method step that the formula for computing a relative offset for a packet in node x, which is destined for node y among an n node set, is $r=(y-x) \bmod n$. Thus, the relative offset r for the first packet in node 2, which is destined for node 0, is $r=(0-2) \bmod 5=3$. Likewise, the second packet has the destination address of 1 and a relative offset of $(1-2) \bmod 5=4$. The third packet has the destination address of 3 and a relative offset of $(3-2) \bmod 5=1$. The fourth packet has the destination address of 4 and a relative offset of $(4-2) \bmod 5=2$. The relative offsets for all message packets contained in processor nodes P0, P1, P3 and P4 can be computed in a similar manner. The results for each computation are as shown in FIG. 2.

Figure 3A:
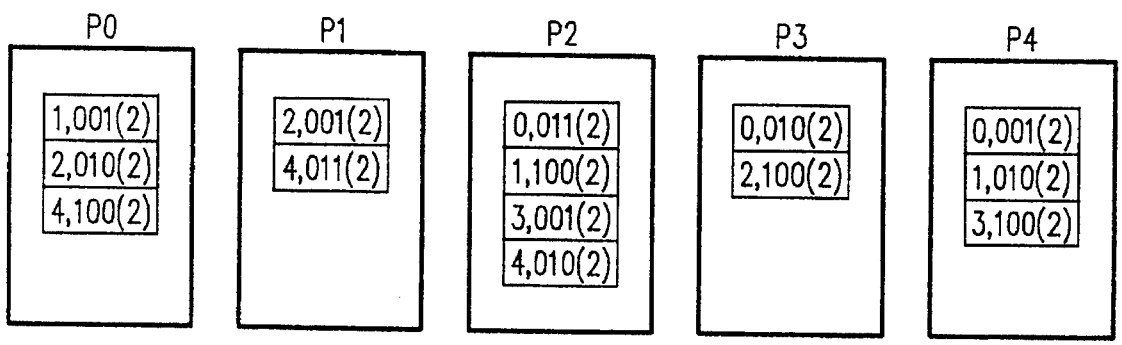
FIG. 3A is a diagram of a set of nodes having processor addresses P0–P 4 wherein a number of message packets are contained and wherein a (destination, relative offset, (base)) is associated with each message packet.
Figure 3B:
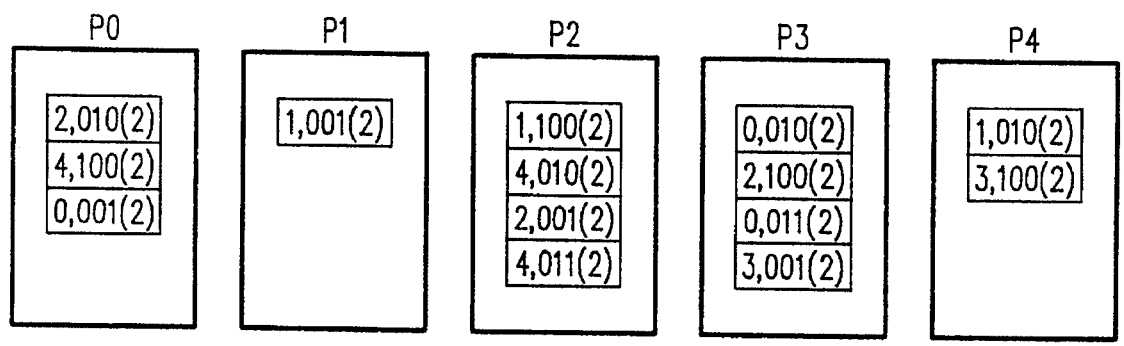
FIG. 3B is a diagram of the set of nodes of FIG. 3A wherein all message packets having a non-zero value in the 0-th digit of the offset have been packed together and delivered to their respective intermediate destination nodes during phase 0 of the present method.

Reference is now made to FIG. 3A which shows the set of nodes of FIG. 2A wherein the relative offsets of all message packets in all nodes have been represented in the base-2 numbering system, i.e., b=2. The number in parentheses shows the chosen base for this particular example which is 2. FIG. 3B shows the set of nodes of FIG. 3A wherein the message packets, which are subject to communication during phase 0 of the present method, have been delivered to their respective intermediate destination nodes. Recall that in the third method step there are $k=\lceil \log_b n \rceil$ phases iterating from phase 0 through phase b-1. Thus, for the example shown in FIG. 3A through 3D, there are $k=\lceil \log_2 5 \rceil=3$ phases, iterating from phase 0 through phase 2. During each phase, there is only a single subphase because (b−1)=1. During the subphase 1 of phase 0, all message packets at node x for which the 0-th offset digit has the value of 1 are packed and sent to node $y=(x+1) \bmod n$. Thus during phase 0, the first packet at node 0 in FIG. 3A, having a relative offset 001(2) in the base-2 representation, needs to be sent to node $(0+1) \bmod 5=1$. Similarly, the second and third packets at node 0 in FIG. 3A will not be communicated since the digit 0 of their relative offsets have the value of 0. Likewise, the first and second packets of node 1 in FIG. 3A are packed and sent to node $(1+1) \bmod 5=2$. These two packets, which are destined for the same intermediate destination node, will be packed together into a larger message packet before being sent to node 2 so as to reduce the communication start-up time. As a result, these two packets appear in node 2 of FIG. 3B after the completion of phase 1 of the present method. Likewise, the first and third message packets of node 2 in FIG. 3A will be packed and sent to destination node $(2+1) \bmod 5=3$. As compared with FIG. 3B, FIG. 3C shows the set of nodes of FIG. 3B wherein the message packets, which are subject to communication during phase 1, have been delivered to their respective intermediate destination nodes.

Recall that for b=2 there is only one subphase per phase. During the subphase 1 of phase 1, all message packets at node x for which the 1-st offset digit has the value of 1 are to be communicated to node $y=(x+2) \bmod 5$. Thus during phase 1, the first packet at node 0 in FIG. 3B is sent to node $(0+2) \bmod 5=2$ of FIG. 3C. The second and third packets of node 0 in FIG. 3B are not communicated because their 1-st offset digits have the value of 0. Likewise, the second and fourth packets of node 2 in FIG. 3B are packed together to form a larger packet and sent to node $(2+2) \bmod 5=4$.

Figure 3C:
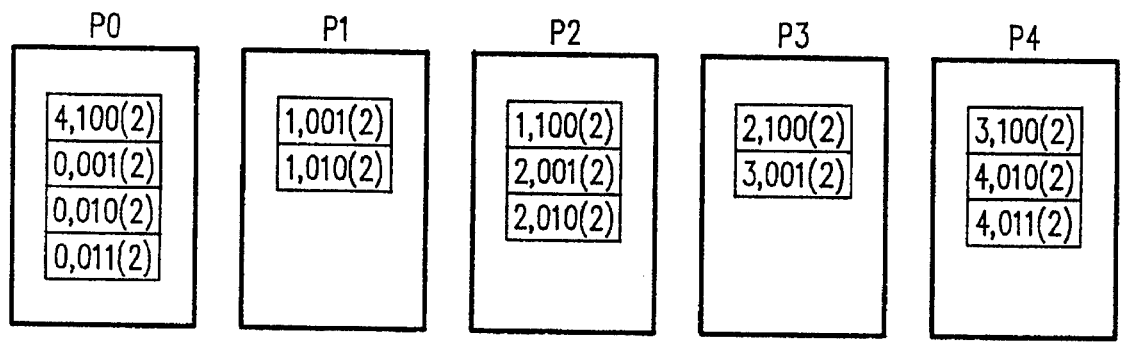
FIG. 3C is a diagram of the set of nodes of FIG. 3B wherein all message packets having a non-zero value in the 1-st digit of the offset have been packed together and delivered to their respective intermediate destination nodes during phase 1 of the present method.
Figure 3D:
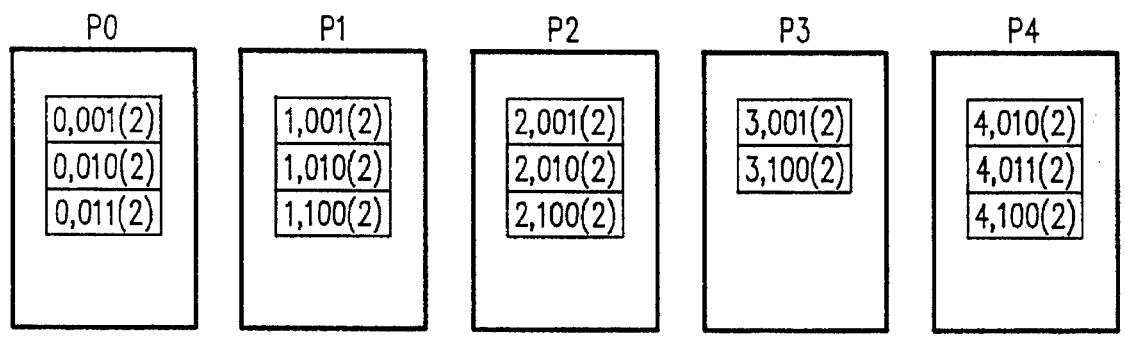
FIG. 3D is a diagram of the set of nodes of FIG. 3C wherein all message packets having a non-zero value in the 2-nd digit of the offset have been packed together and delivered to their respective intermediate destination nodes during phase 2 of the present method.

As compared with FIG. 3C, FIG. 3D shows the set of nodes of FIG. 3C wherein the message packets, which are subject to communication during the phase 2 of the present method, have been delivered to their respective destination nodes. Again, there is only one subphase per phase for b=2. During the subphase 1 of phase 2, all message packets at node x for which the 2-nd offset digit having the value of 1 are to be communicated to node $y=(x+4) \bmod 5$. Thus during phase 1, the first packet of node 0 in FIG. 3C is sent to node $(0+4) \bmod 5=4$ of FIG. 3D. The second, third, and fourth packets of node 0 in FIG. 3C are not communicated because the 2-nd offset digits has a value of 0. Likewise, the first packet of node 2 in FIG. 3C is sent to node $(2+4) \bmod 5=1$.

Figure 4A:
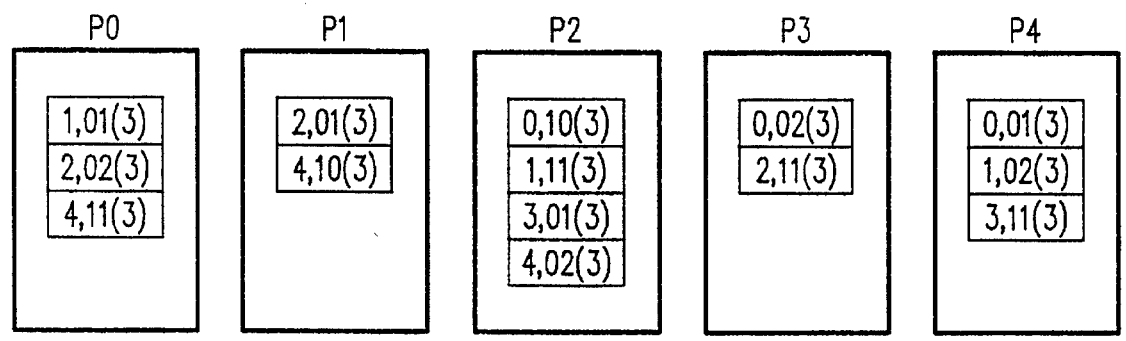
FIG. 4A is a diagram illustrating a set of nodes having processor addresses P0– P4 wherein each node has a number of message packets contained therein and wherein a (destination, relative offset, (base)) is associated with each message packet.

Reference is now being made to FIG. 4A which shows the set of nodes wherein the relative offsets of all message packets in all nodes have been represented in the base-3 numbering system, i.e., b=3. The number in parentheses shows the chosen base for this particular example which is 3.

Figure 4B:
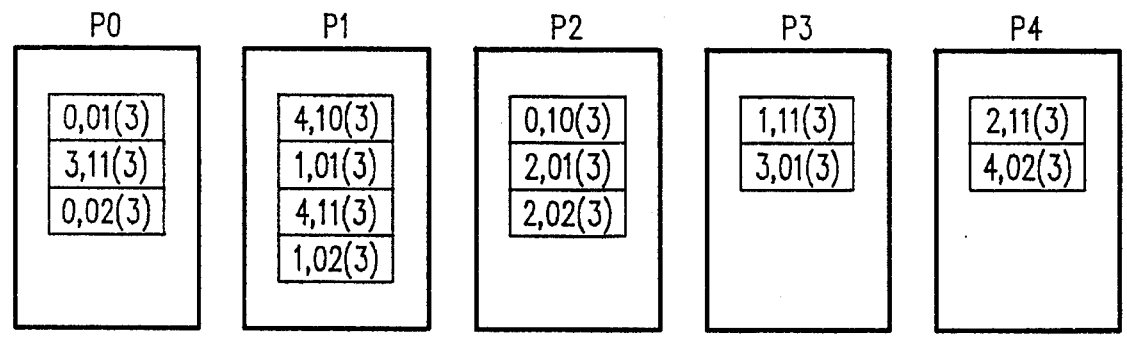
FIG. 4B is a diagram of the set of nodes of FIG. 4A wherein all message packets having a non-zero value in the 0-th digit of the offset have been packed together and delivered to their respective intermediate destination nodes during phase 0 of the present method.

As compared with FIG. 4A, FIG. 4B shows the set of nodes of FIG. 4A wherein the message packets, which are subject to communication during phase 0, have been delivered to their respective intermediate destination nodes. For the example shown in FIG. 4A–4C, there are $k=\lceil \log_3 5 \rceil=2$ phases iterating from phase 0 to phase 1. There are 2 subphases per phase because (b−1)=2.

During the subphase 1 of phase 0, all message packets at node x for which the 0-th offset digit has the value of 1 are packed and communicated to node $y=(x+1) \bmod n$. For instance, the first and third packets at node 0 in FIG. 4A need to be packed together and communicated to node $(0+1) \bmod 5=1$. During the subphase 2 of phase 0, all message packets at node x, for which the 0-th offset digit has the value of 2, are packed together and communicated to node $y=(x+2) \bmod n$. For instance, the second packet of node 0 in FIG. 4A is sent to node $(0+2) \bmod 5=2$.

Figure 4C:
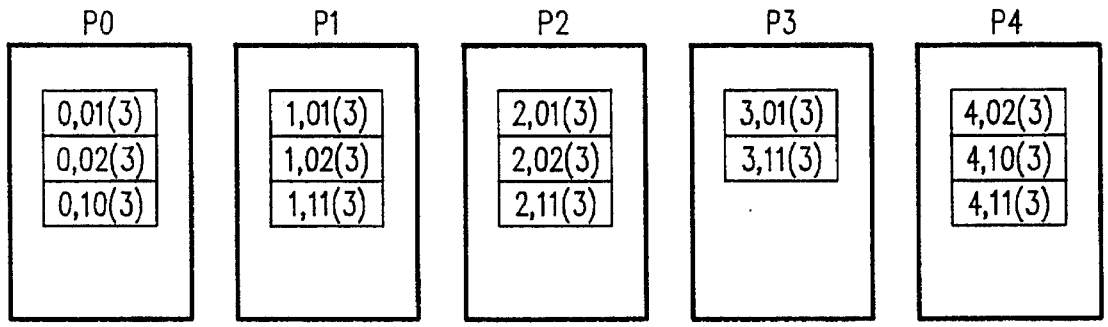
FIG. 4C is a diagram of the set of nodes of FIG. 4B wherein all message packets having a non-zero value in the 1-st digit of the offset have been packed together and delivered to their respective intermediate destination nodes during phase 1 of the present method.

As compared with FIG. 4B, FIG. 4C shows the set of nodes of FIG. 4B wherein the message packets which are subject to communication during phase 1, have been delivered to their respective destination nodes. Recall that there are 2 subphases for b= 3. During the subphase 1 of phase 1, all message packets at node x for which the 1-st offset digit has the value of 1 are packed together and communicated to node $y=(x+3) \bmod n$. For instance, the first and third packets of node 1 in FIG. 4B are packed and communicated to node $(1+3) \bmod 5=4$ of FIG. 4C. During the subphase 2 of phase 1, all message packets at node x for which the 1-st offset digit has the value of 2 are packed together and communicated to node $y=(x+2\times 3) \bmod n$. Note that since there is no packet which has the offset digit value of 2 in the 1-st offset digit, the subphase 2 of phase 1 is ignored.

Figure 5A:
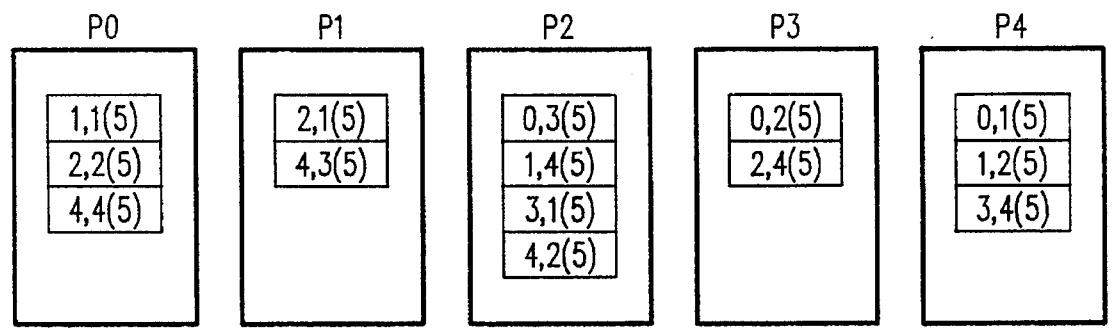
FIG. 5A is a diagram illustrating a set of 5 nodes having processor addresses P0– P4 wherein each node has a number of message packets contained therein and wherein a (destination, relative offset, (base)) is associated with each message packet.

Reference is now being made to FIG. 5A which shows the set of nodes wherein the relative offsets of all message packets in all nodes have been represented in the base-5 numbering system, i.e., b=5. The number in parentheses shows the chosen base for this particular example which is 5.

Figure 5B:
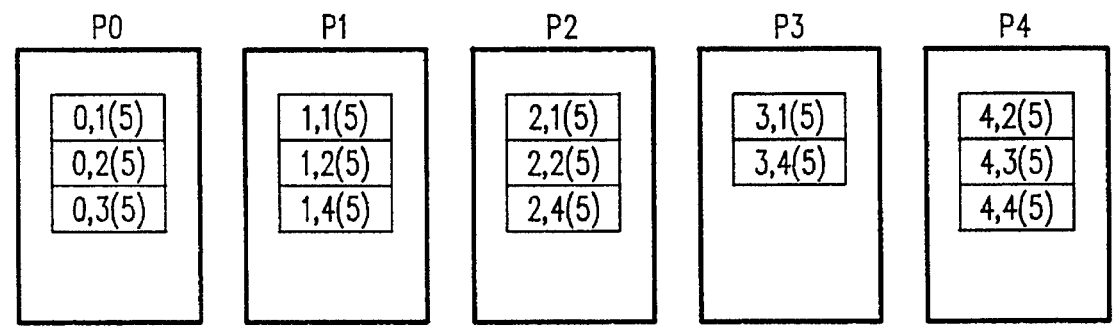
FIG. 5B is a diagram of the set of nodes of FIG. 5A wherein all message packets having a non-zero value in the 0-th digit of the offset have been packed together and delivered to their respective intermediate destination nodes during phase 0 of the present method.

As compared with FIG. 5A, FIG. 5B shows the set of nodes of FIG. 5A wherein the message packets, which are subject to communication during phase 0, have been delivered to their respective destination nodes. For the example shown in FIGS. 5A and 5B, there are k=⌈log₅5⌉=1 phase. As such during this single phase, there are 4 subphases because (b−1)=4. During the subphase 1 of phase 0, all message packets at node x for which the 0-th offset digit has the value of I are packed together and communicated to node y= (x+1) mod n. For instance, the first packet at node 0 in FIG. 5A is sent to node (0+1) mod 5=1. During the subphase 2 of phase 0, all message packets at node x for which the 0-th offset digit has the value of 2 are packed together and communicated to node y= (x+2) mod n. It should be clear at this point that the second packet at node 0 in FIG. 5A is sent to node (0+2) mod 5=2. In general, during the subphase i of phase 0, where 1<i< b−1, all message packets of node x for which the 0-th offset digit has the value of i are packed together and communicated to node y=(x+ i) mod n.

It should be noted that regardless of the value of the base-b chosen, the final configurations as shown in FIGS. 3D, 4C and 5B respectively are all the same. Therefore, the present method works regardless of the value of the selected base-b as long as it is an integer in the range of 2 through n.

It should be understood that other forms and variations of the present multi-packet routing method are within the scope of the present invention. For instance, the base used to encode the relative offset from the range of 1 through n−1 can be a mixed base. Consider n=6 nodes. One can then choose 3 as the base for offset digit 0 and 2 as the base for offset digit 1. Thus, in the (23)-mixed-base representation, the value of 0, 1, 2, 3, 4, and 5 can be represented as (00), (01), (02), (10), (11), and (12) respectively.

Another variation within the scope of the present invention is based on the communication model. For instance, in the c-port communication model, where each node can send messages to any set of c-other nodes and receive messages from any set of c-other nodes, the number of subphases for each phase becomes $$\left\lceil \frac{b-1}{c} \right\rceil$$

(or ceiling of $$\frac{b-1}{c})$$

because in each phase each node has messages which need to be communicated to up to b−1 different intermediate destination nodes and c of them can be communicated simultaneously in one communication step.

The method of the present invention can find uses for other interesting special cases for multi-packet routing operation which include the scatter, gather, and index operations. In the scatter operation among n-nodes, there is one single source node that has n blocks of data which need to be distributed to all n-nodes with one datablock per node. In the gather operation among n-nodes, each node has one datablock initially and there is one destination node that needs to collect all n-datablocks from all n-nodes, i.e., concatenate datablocks without performing reduction. Scatter and gather are inverse operation of each other. Both operations are frequently used in real applications such as transposing a row vector or column vector.

In the index operation among n-nodes, each node has n-blocks of data need to be distributed to all nodes in the set with one datablock per node. More precisely, the goal of the index operation is to exchange the i-th datablock in node j with the j-th datablock in node i, for all 0< i, j<n−1.

The algorithm for an index operation can be represented as a sequence of processor-memory configurations. Each processor-memory configuration has n-columns of n-blocks each. Columns are labeled from 0 through n−1 from left to right in all subsequent figures and blocks are labeled from 0 through n−1 from top to bottom. Column j represents node j while block i represents the i-th datablock in a memory offset. The objective of an index operation is then to transpose columns of blocks efficiently. Thus, each datablock in the index operation corresponds to a packet in the multi-routing operation in that each node has n-packets of the same size which need to be sent to n-nodes in the set including a packet for itself.

Figure 6:
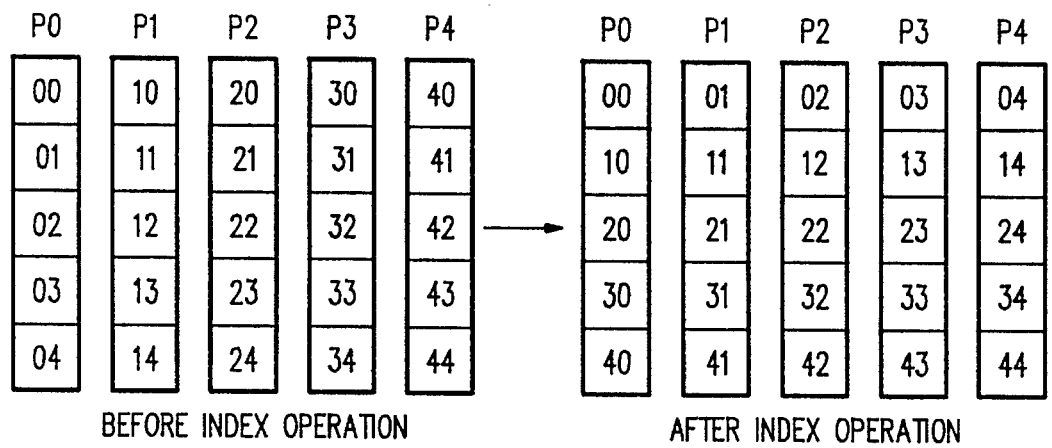
FIG. 6 is a diagram showing the processor-memory configurations before and after an index operation performed for 5 nodes.

FIG. 6 shows an example of the processor-memory configurations before and after an index operation performed for n=5. The notation "ji" in each box represents the i-th datablock allocated to node j initially. The label i will be referred to as the block-id.

Figure 7:
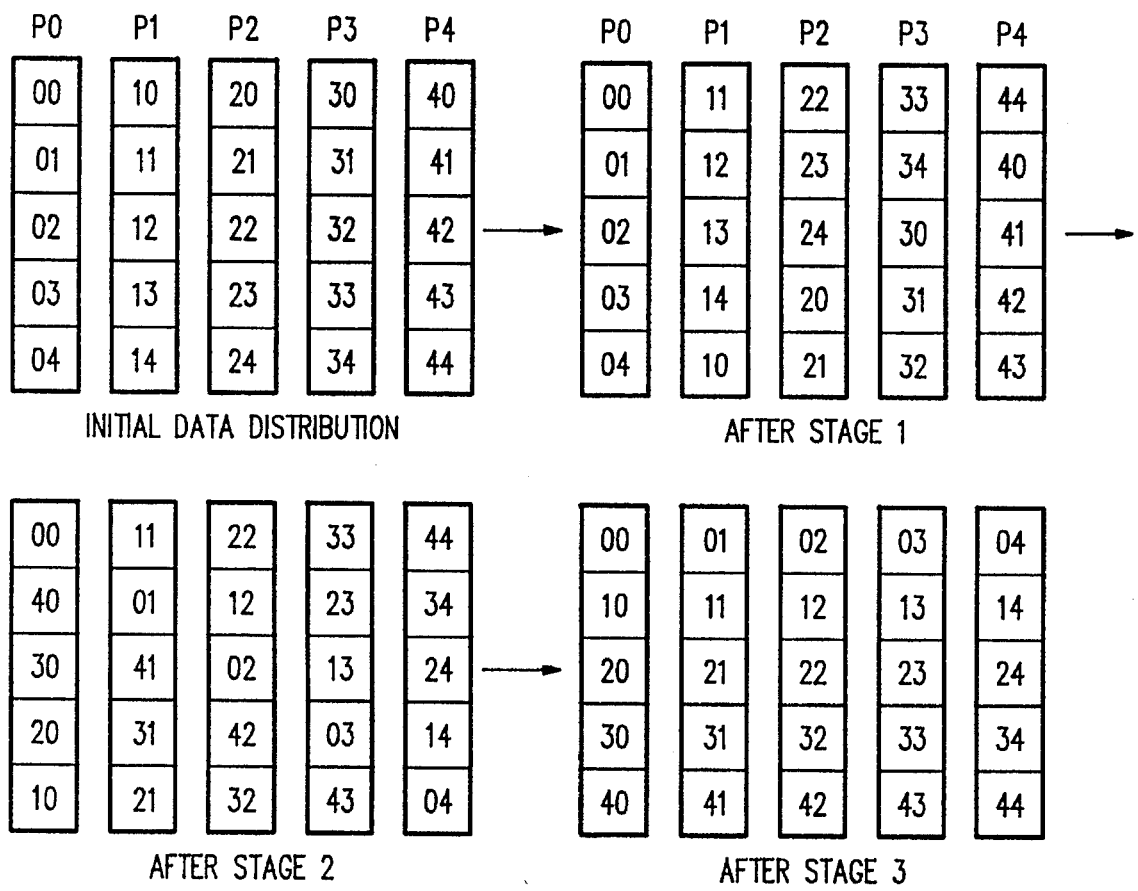
FIG. 7 is a diagram showing the processor-memory configurations before stage 1, and after stages 1, 2 and 3 respectively of an index operation performed for 5 nodes.

The index method contains 3 stages. In stage 1, each node j locally rotates all its n-blocks up by j steps. In stage 2, each node j rotates its i-th block to the right for i steps to node (j+ i) mod n. In stage 3, each node j locally moves its i-th block, for all 0<i< n−1, to its y-th block where y=(j−i) mod n. Stages 1 and 3 require only local data rearrangement, while stage 2 involves some form of communication between nodes. FIG. 7 shows an example of these three stages for n=5.

In stage 2, let m be the size of a datablock (i.e., packet). Since m=M/n², a preferred value for base-b is chosen to be:

$$\min\nolimits_{\forall b \in \{2,3\ldots,n\}} \left\{ \lceil \log_b n \rceil (b-1) \left[ t_s + \frac{mn}{bn} t_{tr} \right] \right\}.$$

Figure 8:
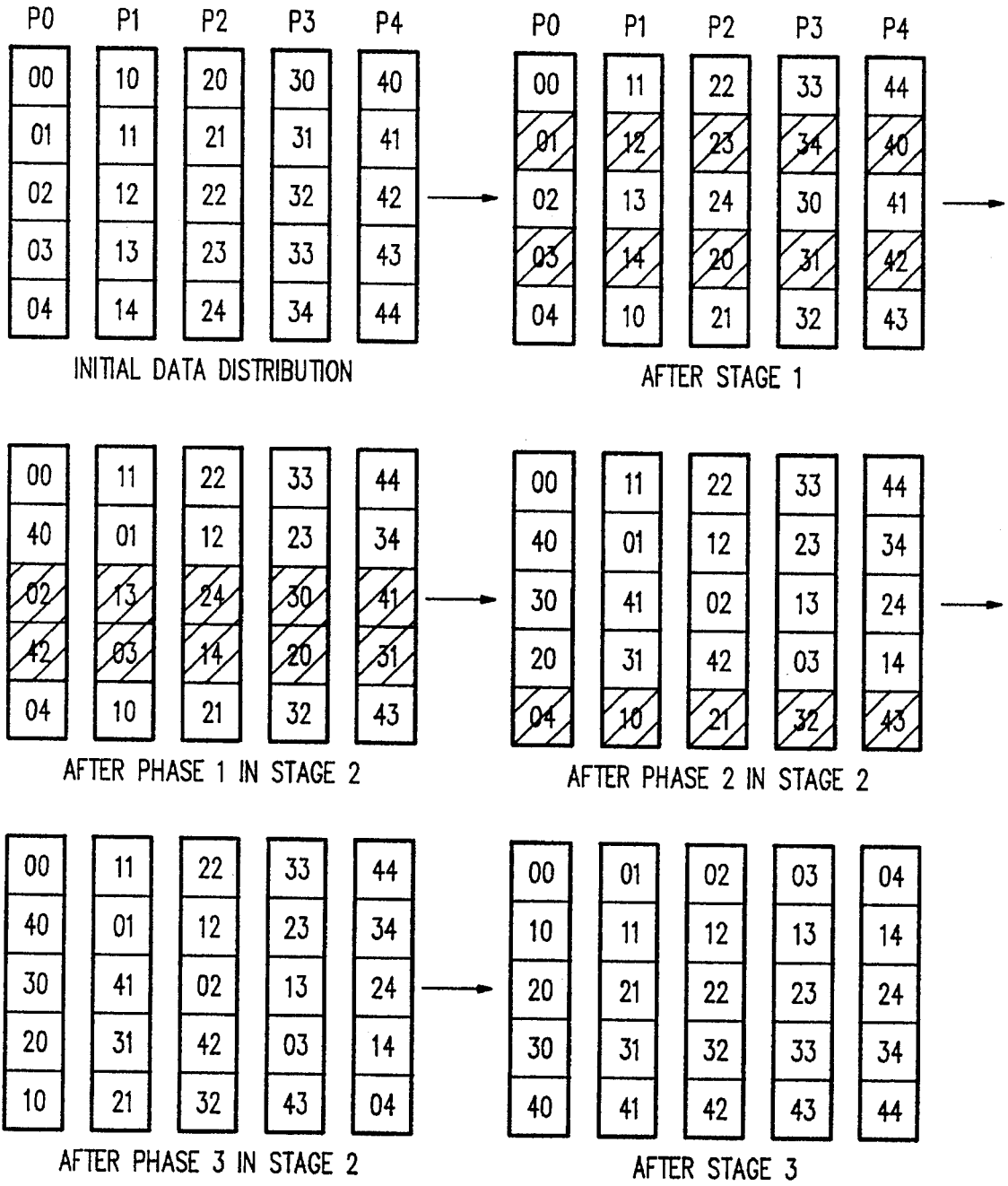
FIG. 8 is a diagram showing the processor-memory configurations before stage 1, after stage 1, after phases 1 through 3 of stage 2, and after stage 3 of an index operation performed for 5 nodes.

When the base-b is chosen to be 2 or n, two interesting cases result. When b= 2, the method has the minimal number of communication start-ups. FIG. 8 shows an example of the algorithm for the index operation for b=2 and n=5. The shaded blocks are the ones subject to rotation during the next phase. When b= n, the method has a minimal data transmission time. Therefore, b=2 should be chosen when the start-up time of the underlying machine is significant whereas b= n should be chosen when the start-up time is negligible. In general, b can be fine-tuned as a function of $t_s$, $t_{tr}$, n and m.

It should also be understood that the aforementioned third method step of the preferred embodiment can be iterated in any arbitrary order, not necessary in the order of 0, 1, . . . , k−1. For instance, when k=3, any ordering of the 3 iterations, such as (0, 1, 2), (0, 2, 1), (1, 0, 2), (1, 2, 0), (2, 0, 1) and (2, 1, 0), will all work. Furthermore, each b−1 subphases within each phase can be iterated in any arbitrary order. In fact, the total number of (b−1)k subphases can be iterated in any arbitrary order. Certain ordering of iterations may be advantageous in minimizing the average arrival time over all message packets. The ordering will depend on the distribution of the sizes and destinations of all message packets.

It should be understood that the third method step of the present invention need not be performed in phases and subphases in a synchronous manner. For instance, a node having no message to send out during a particular subphase can send the message for the next subphase or phase in a greedy manner without idling. Thus, the multi-packet routing can be performed in an asynchronous manner. In this case, some subphases may be repeated, depending on the incoming message packets. However, such subphases repetition if required will not increase the overall communication time.

The relative offset of a packet at node x destined for node y is not just restricted to the value r=(y−x) mod n. Any value which has the same modulo-n value as r may be used as a relative offset. As an example, consider the case where n=5, x=2 and y=3. The relative offset, according to the second method step of the preferred embodiment, is r=1. An alternative relative offset can be 6. By treating the new relative offset 6 as the sum of 2 and 4, this packet from node 2 will first be forwarded to node (2+ 2) mod 5=4, then to node (4+4) mod 5=3. Alternatively, by treating the new relative offset 6 as the sum of 3 and 3, this packet from node 2 will first be forwarded to node (2+3) mod 5=0, then to node (0+3) mod 5=3.

It should also be understood that many encoding schemes can be used to represent the relative offset r, in particular for those encoding schemes wherein a number is represented as the sum of numbers represented by each digit. As an example, an encoding using the Chinese Remainder Theorem, which is a well known theorem in the field of number theory, can be used to encode the relative offset.

In summary, the present invention provides a method for routing message packets to their respective destinations on a parallel system taking into account the value of the communication start-up time and the transmission time. The present method for multi-packet routing of a plurality of datablocks among an arbitrary subset of processors on a message-passing parallel systems is efficient for frequently used communication primitives such as the scatter, gather, index, and the multi-packet routing operations and is topology independent so as to achieve maximum portability for an arbitrary number of processors not restricted to a particular structure such as a subcube or submesh.

This invention may be embodied in other specific forms without departing from its spirit or essential characteristics. The above-described embodiments of the present invention are to be considered in all respects only as illustrative and not restrictive in scope. The scope of the invention is, therefore, indicated by the appended claims rather than by the above-detailed description. Therefore, all changes which come within the meaning and range of equivalency of the claims are to be considered embraced within their scope.

What is claimed and desired to be secured by United States Letters Patent is:

1. A parallel system of nodes for routing datablocks to their respective destination nodes, the parallel system having a plurality of parameters including a communication start-up time, a transmission time, and an amount of overall data to be routed among a number of nodes, the parallel system comprising:
   a) means for selecting a numbering system based on the parameters;
   b) means for subtracting, for each datablock, the node address from the destination address of the datablock to form an offset;
   c) means for representing the offset in the numbering system; and
   d) means for sending the datablocks to their destination nodes in k-phases wherein each phase i, i being between 0 and k−1, inclusive, comprises the steps of:
      1) packing together those datablocks with identical i-th digits of their offsets; and
      2) sending those packed datablocks to their respective intermediate destination node addresses.

2. A parallel system of nodes as defined in claim 1 further comprising means for iterating until all datablocks have been delivered to their respective destinations.

3. A parallel system of nodes as defined in claim 2 further comprising means for taking into account in the iteration the communication start-up time, the transmission time, an amount of overall data for the parallel system, and a number of nodes involved in the routing of the datablocks to their respective destination nodes.

4. A parallel system of nodes as defined in claim 1, wherein means for sending the datablocks includes means for subtracting, for each datablock, the node address from the destination address of the datablock to form an offset.

5. A parallel system of nodes as defined in claim 4 further comprising means for packing together those datablocks based on the offsets.

6. A method for routing a plurality of datablocks to their respective destinations on a parallel system, the parallel system having a plurality of parameters including a communication start-up time, a transmission time, and an amount of overall data to be routed among a number of nodes, the method comprising the steps of:
   a) selecting a numbering system using said parameters;
   b) for each datablock, subtracting the node address from the destination address of the datablock to form an offset;
   c) representing the offset in the numbering system; and
   d) sending the datablocks to their destination nodes in k-phases wherein each phase i, i being between 0 and k−1, inclusive, comprises the steps of:
      1) packing together those datablocks with identical i-th digits of their offsets; and
      2) sending those packed datablocks to their respective intermediate destination node addresses.

7. A method as defined in claim 6, wherein the steps b–d are iterated until all datablocks have been delivered to their respective destinations.

8. A method as defined in claim 7 further comprising the step of taking into account in the iteration the communication start-up time, the transmission time, an amount of data overall for the parallel system, and a number of nodes involved in the routing of the datablocks to their respective destinations.

9. A method as defined in claim 6, wherein the step of sending the datablocks includes the step, executed for each datablock, of subtracting the node address from the destination address of the datablock to form an offset.

10. A method as defined in claim 9 further comprising the step of packing together those datablocks based on the offsets.

11. A computer program product for routing a plurality of datablocks to their respective destinations on a parallel system, the parallel system having a plurality of parameters including a communication start-up time, a transmission time, and an amount of overall data to be routed among a number of nodes, the computer program product comprising:
   a recording medium;
   means, recorded on said medium, for instructing the parallel system to perform the instruction steps of:
   a) selecting a numbering system using said parameters;
   b) for each datablock subtracting the node address from the destination address of the datablock to form an offset;
   c) representing the offset in said selected numbering system; and
   d) sending the datablocks to their destination nodes in k-phases wherein each phase i, i being between 0 and k−1, inclusive, comprises the steps of:

1) packing together those datablocks with identical i-th digits of their offsets; and
2) sending those packed datablocks to their respective intermediate destination node addresses.

12. A computer program product as defined in claim 11 further comprising means, recorded on the recording medium, for instructing the computer system to iterate the steps b–d until all datablocks have been delivered to their respective destinations.

13. A computer program product as defined in claim 12 further comprising means, recorded on the recording medium, for instructing the computer system to take into account in the iteration the communication start-up time, the transmission time, an amount of overall data for the computer system, and a number of nodes involved in the routing of the datablocks to their respective destinations.

14. A computer program product as defined in claim 11, wherein the instruction step of sending the datablocks includes the instruction step, executed for each datablock, of subtracting the node address from the destination address of the datablock to form an offset.

15. A computer program product as defined in claim 14 wherein said means for instructing the computer system comprises the further instruction step of packing together those datablocks based on the offsets.

* * * * *